United States Patent
Ambrus et al.

(10) Patent No.: US 12,234,714 B2
(45) Date of Patent: Feb. 25, 2025

(54) CLEANSING OF DRILLING SENSOR READINGS

(71) Applicant: Intellicess, Inc., Austin, TX (US)

(72) Inventors: Adrian Marius Ambrus, Stavanger (NO); Pradeepkumar Ashok, Austin, TX (US)

(73) Assignee: Intellicess, Inc., Austin, TX (US)

( * ) Notice: Subject to any disclaimer, the term of this patent is extended or adjusted under 35 U.S.C. 154(b) by 514 days.

(21) Appl. No.: 15/908,456

(22) Filed: Feb. 28, 2018

(65) Prior Publication Data

US 2022/0284330 A1 Sep. 8, 2022

Related U.S. Application Data

(60) Provisional application No. 62/464,475, filed on Feb. 28, 2017.

(51) Int. Cl.
| | |
|---|---|
| *E21B 44/00* | (2006.01) |
| *G06F 18/15* | (2023.01) |
| *G06N 7/01* | (2023.01) |

(52) U.S. Cl.
CPC .............. *E21B 44/00* (2013.01); *G06F 18/15* (2023.01); *G06N 7/01* (2023.01); *E21B 2200/20* (2020.05)

(58) Field of Classification Search
None
See application file for complete search history.

(56) References Cited

U.S. PATENT DOCUMENTS

| | | | |
|---|---|---|---|
| 6,594,620 B1 * | 7/2003 | Qin | .......................... G05B 9/02 |
| | | | 702/183 |
| 2004/0064258 A1 * | 4/2004 | Ireland | .................... E21B 47/00 |
| | | | 702/9 |

FOREIGN PATENT DOCUMENTS

WO    WO-2016160005 A1 * 10/2016    ............. E21B 41/00

OTHER PUBLICATIONS

Y. Xiang, Y. Tang, and W. Zhu. (Mobile sensor network noise reduction and recalibration using a Bayesian network) Received: May 13, 2015—Published in Atmos. Meas. Tech. Discuss.: Aug. 31, 2015 (Year: 2015).*

* cited by examiner

*Primary Examiner* — Matthew G Marini
(74) *Attorney, Agent, or Firm* — AVEK IP, LLC

(57) ABSTRACT

Drilling rig operations may be monitored using a variety of sensors and/or other data sources. Erroneous, faulty, and/or missing data may be cleansed prior to using the data for modeling and/or monitoring drilling operations. Erroneous, faulty, and/or missing data may be identified by comparing received data to anticipated values based on historical operations, other physically related sensor readings, and known operating ranges. Cleansing may comprise replacing erroneous, faulty, and/or missing data with a modeled value or omitting a reading entirely.

20 Claims, 10 Drawing Sheets

CLEANSING OF DRILLING SENSOR READINGS

CROSS-REFERENCE TO RELATED APPLICATIONS

This application claims the benefit of U.S. provisional patent application No. 62/464,475, entitled "CLEANSING OF DRILLING SENSOR READINGS," filed on Feb. 28, 2017, and which is incorporated herein by reference.

FIELD OF INVENTION

The present invention relates to drilling systems and methods. More particularly, the present invention relates to systems and methods for monitoring drilling operations.

BACKGROUND AND DESCRIPTION OF THE RELATED ART

Oil and gas drilling necessarily involves complex equipment and processes. The proper operation of the drilling equipment is vital for, among other reasons, the safety of workers, the protection of the environment, and the profitability of the drilling company. Data collected from sensors during the drilling process can, at least in theory, provide guidance for safe and efficient drilling. Collecting sensor measurements during oil and gas drilling and analyzing the data contained within those measurements for use in managing drilling processes presents opportunities to improve drilling operations, but also presents practical challenges for drillers.

One challenge to monitoring drilling operations can be the sheer volume of measurements potentially available, which can be difficult for a human operator to process. While computerized systems can manage large volumes of sensor measurements, the complexity of interrelationships between drilling equipment and the sensors reading the status of that equipment and of the well being drilled can mask detrimental situations and/or generate false alarms that cannot be readily identified by a computerized system that simply compares sensor measurements to predefined parameters. Approaches such as the use of Bayesian network models described in U.S. patent application Ser. No. 13/402,084 (entitled "Distinguishing Between Sensor and Process Faults in a Sensor Network with Minimal False Alarms Using a Bayesian Network Based Methodology," incorporated herein by reference) and U.S. patent application Ser. No. 14/017,430 (entitled "Presenting Attributes of Interest in a Physical System Using Process Maps Based Modeling," also incorporated herein by reference) can help correctly identify interrelationships between multiple sensor measurements that human operators or unsophisticated computer analysis would overlook, but such approaches are still dependent upon the quality of sensor measurements themselves.

The sensors used to monitor oil and gas drilling typically lack assurances of the quality the measurements made. Calibration of deployed sensors can be difficult or impossible during drilling operations, and even if a sensor malfunction is detected the rapid replacement of that sensor may not be possible. Even if detected, sensor faults may be transitory or attributable to drilling conditions that rapidly change, making an immediate recalibration or replacement of the sensors unnecessary. Whatever the reason for a sensor fault, the reliance upon an incorrect sensor reading for managing drilling operations does nothing to improve drilling performance and may often do harm to the drilling operations.

SUMMARY OF THE INVENTION

Systems and methods in accordance with the present invention improve drilling operations by identifying sensor faults and appropriately remedying the detected fault. Some sensor faults are relatively easy to identify. For example, sometimes the sensor fault results in one or more measurement from a sensor being entirely absent. In other instances, a sensor fault may result in one or more measurement that may be readily discarded as an outlier, for example due to the sheer physical impossibility of the measurement being accurate or based upon the extreme discrepancy of the faulty measurement in light of other measurements made either by the same sensor at different times/depths or measurements made by other sensors that relate to the erroneous measurement.

Systems and methods in accordance with the present invention may identify and remedy obviously faulty sensor readings, but the present invention may further identify and remedy less obvious errors. For example, sometimes a sensor measurement may be faulty, and therefore should not be relied upon to guide drilling operations, but the presence of the fault cannot be readily detected. Such a scenario may occur, for example, in the case of a slowly developing drift or bias. In such circumstances, even a sophisticated, rigorous analysis that uses the faulty measurement may lead to poor results, such as a failure to identify a potentially problematic situation or the triggering of a costly false alarm. Implementing the best drilling analytics methods possible can still result in inappropriate or even counterproductive drilling operations if those methods are based upon erroneous data.

Systems and methods in accordance with the present invention detect sensor faults that would otherwise potentially compromise drilling operations. The identified faulty sensor measurements may then be cleansed from the collected sensor readings before drilling analytics are applied to the measurements. Drilling analytics may be applied to the cleansed measurements to identify problems with current drilling processes (such as inefficient drilling or indications of hazards) and/or to identify opportunities for improved drilling efficiency and safety. By providing cleansed data for use as the basis for drilling analytics, the present method improves drilling processes.

The present invention provides systems and methods to cleanse sensor readings from various types of sensors used in drilling operations. In accordance with the present invention, the readings of different types of sensors may be cleansed in different ways reflective of the type of sensor, the environment in which the sensor operates, and/or the types of measurements made by the sensor. The systems and methods for cleansing sensor readings in accordance with the present invention may also be varied based upon drilling conditions and/or parameters determined by a drilling operator.

While systems and methods for cleansing sensor readings may be varied in accordance with the present invention based upon the types of sensors used, user preferences, and/or drilling conditions, the present invention may generally comprise the collection or receipt of sensor readings, the merging of sensor readings, the pre-processing of sensor readings, the validation of sensor readings, and the repopulation of sensor readings.

The collection or receipt of sensor readings for systems and methods in accordance with the present invention may involve the transfer or entering of readings from a sensor to a computing system executing machine readable code retained in a non-transitory medium that cause a computer processor operating as part of the system to perform cleansing methods in accordance with the present invention. Sensor readings may be received or collected using a data transfer protocol using a wired or wireless medium. Different types of sensors may use different data transfer protocols. Sensor readings may comprise digital or analog representations of measurements made by a sensor. In some cases, the readings of a sensor may be collected or received at substantially the same instant in time the measurement is made by the sensor. In other cases, the readings of a sensor may be temporarily or permanently stored in a memory device to be made available to a system in accordance with the present invention at a time subsequent to when the sensor makes a given measurement.

Merging sensor readings in accordance with the present invention may comprise synchronizing a plurality of sensor measurements. Each sensor measurement of a plurality of sensor measurements may correspond to a particular depth and/or time of the measurement. Synchronizing those measurements using the time at which a particular sensor made the measurement and the depth at which the measurement was made may permit a plurality of disparate measurements made by disparate sensors to be combined to provide a holistic view of the operations of a drilling operation.

Preprocessing of the synchronized sensor readings in accordance with the present invention may remove missing measurements and/or outlier measurements. Missing measurements may be detected as a gap or omission in collected measurements. Outliers may be identified based upon the physical implausibility of a sensor measurement (which may in turn be based upon the type of sensor and/or the conditions under which the sensor is operating) and/or the overall trend of measurements made by a given sensor.

The validation of sensor measurements in accordance with the present invention may determine the trustworthiness of the measurements and may use a Bayesian network model to identify errors in the sensor measurements not identifiable in the preprocessing step. The use of a Bayesian network model for data validation in accordance with the present invention increases the accuracy and precision of the data used to monitor a drilling operation.

The repopulation of sensor measurements in accordance with the present invention may use probabilistic estimates derived using the Bayesian network model to replace bad or missing data. By repopulating the sensor measurements in accordance with the present invention, the modeling, monitoring, and/or guidance derived from the sensor measurements may be improved from modeling, monitoring, and/or guidance derived from uncleansed sensor measurements.

In examples described herein, systems and methods in accordance with the present invention for cleansing sensor measurements are described for use with top drive torque sensors, top drive speed sensors, mud pit volume sensors, flow in sensors, flow out sensors, hook load sensors, standpipe pressure sensors, and block position sensors. Systems and methods in accordance with the present invention may be used to cleanse measurements from other types of sensors than the present examples. Further, the present invention may be used to cleanse measurements from fewer and/or different types of sensors than described in the present examples.

The sensor measurements cleansed using systems and methods in accordance with the present invention may comprise real time data, but additionally/alternatively may comprise previously collected data (such as data from a morning report) or well plan data. The present invention is not limited to cleansing drilling data of any particular data type or collection.

BRIEF DESCRIPTION OF THE SEVERAL VIEWS OF THE DRAWINGS

Examples of systems and methods in accordance with the present invention are described in conjunction with the attached drawings, wherein.

DETAILED DESCRIPTION

Figure 1:
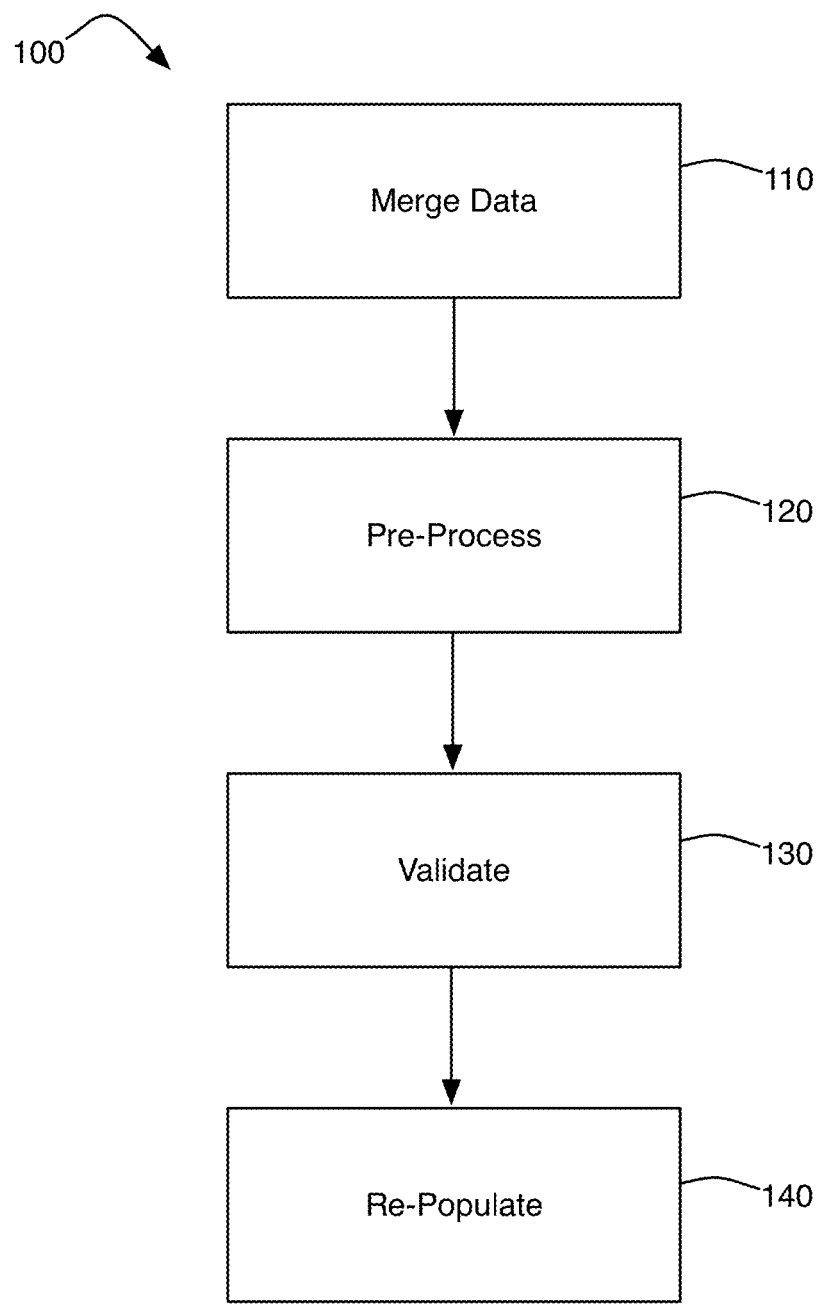
FIG. 1 illustrates an example of a method in accordance with the present invention.

FIG. 1 illustrates an example method 100 of cleansing drilling data in accordance with the present invention. Method 100 may begin with a data merge step 110 in which collected sensor readings are merged to synchronize measurements based upon time and/or depth. The sensor readings merged in step 110 may be previously collected sensor readings and/or sensor readings collected in substantially real time.

A preprocessing step 120 may be performed upon the collected sensor readings. The preprocessing step may identify missing data and/or identify data outliers. Missing data identified in step 120 may indicate that a sensor is off-line and/or the sensor reading could not be collected for whatever reason. Rather than erroneously attributing a value, such as zero, to missing sensor readings, preprocessing step 120 may identify those sensor reading gaps and eliminate those gaps from the data set. Preprocessing step 120 may further identify outliers in the sensor readings collected in step 110. Outliers identified in step 120 may comprise, for example, physically impossible sensor readings and/or readings that are clearly impossible based upon historical trends of that or other sensors and/or contemporaneous readings of related sensors.

Method 100 may proceed to validation step 130. In validation step 130 the merged and preprocessed data may be validated to identify erroneous sensor readings using a Bayesian network model, one example of which is further described herein. Validation step 130 may determine the trustworthiness of sensor readings and, if necessary, adjust the readings for modeling purposes to avoid inaccurate conclusions based upon those readings.

Method 100 may proceed to repopulation step 140. In repopulation step 140 probabilistically derived values may be substituted for erroneous sensor readings identified in validation step 130. Repopulation step 140 may replace the erroneous sensor readings with estimates derived from historical and/or contemporaneous sensor readings. Examples of methods that may be used to derive data for use in repopulation step 140 for different types of sensors are described further below.

Figure 2:
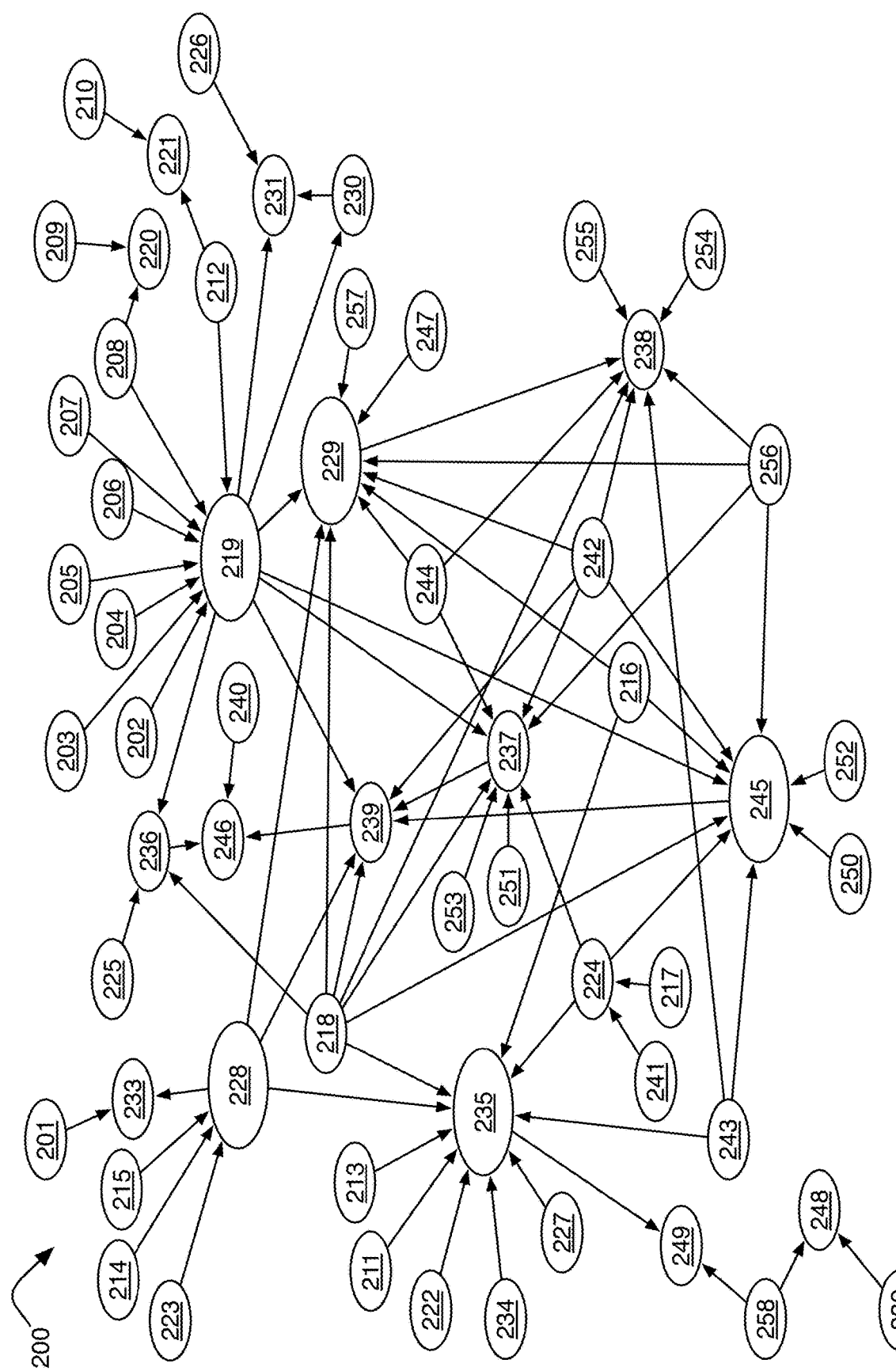
FIG. 2 illustrates an example of a Bayesian network that may be used to cleanse sensor readings using systems and methods in accordance with the present invention.

FIG. 2 illustrates an exemplary holistic Bayesian network that may be used in accordance with the present invention to aggregate sensor readings from multiple sources into a model that combines real time sensor data, morning report data, other historical sensor data, and/or well plan data. Sensor readings that are validated and cleansed in accordance with the present invention using the holistic Bayesian network 200 illustrated in FIG. 2 may comprise reading from any sensor used to monitor and/or measure the performance of a drilling operation. For example, sensor measurements and/or data derived from sensor measurements that may be cleansed in accordance with the present invention may comprise total pump output data (i.e., pump strokes per minute), top drive/rotary table torque data, top drive/rotary table speed data, mud pit volume data, flow in data, flow out data, hook load data, standpipe pressure data, and/or block position data. The general use of a Bayesian network model for drilling rig sensor modeling is described in U.S. patent application Ser. No. 13/402,084, entitled "Distinguishing Between Sensor and Process Faults in a Sensor Network with Minimal False Alarms Using a Bayesian Network Based Methodology," and U.S. patent application Ser. No. 14/017,430, entitled "Presenting Attributes of Interest in a Physical System Using Process Maps Based Modeling," both of which are incorporated by reference herein. The holistic Bayesian network 200 illustrated in FIG. 2 provides interconnected nodes corresponding to drilling properties and/or drilling sensor measurements. The various parameters and measurements of a drilling operation are interrelated, and, correspondingly, each node of the holistic Bayesian network 200 probabilistically interacts with at least one other node. While holistic Bayesian network models other than the model 200 illustrated in FIG. 2 may be used in systems and methods in accordance with the present invention, model 200 is illustrated herein for exemplary purposes. In the model 200 depicted in FIG. 2, fifty-eight exemplary nodes are provided, wherein the identifier "RT" stands for real-time data, "MR" stands for morning report data, and "Calc" refers to parameters that are calculated but not directly measured:

| Reference | Node |
| --- | --- |
| 201 | Previous hole depth (RT) |
| 202 | Pump 1 liner size (MR) |
| 203 | Pump 1 stroke length (MR) |
| 204 | Pump 1 efficiency (MR) |
| 205 | Pump 2 liner size (MR) |
| 206 | Pump 2 stroke length (MR) |

-continued

| Reference | Node |
| --- | --- |
| 207 | Pump 2 efficiency (MR) |
| 208 | Pump 1 strokes per minute (RT) |
| 209 | Pump 1 total strokes previous (RT) |
| 210 | Pump 2 total strokes previous (RT) |
| 211 | Block weight (MR) |
| 212 | Pump 2 strokes per minute (RT) |
| 213 | Drill collar 1 unit weight (MR) |
| 214 | Previous block height (RT) |
| 215 | Previous bit depth (RT) |
| 216 | Bottom-hole assembly length (MR) |
| 217 | Drill collar 1 length (MR) |
| 218 | Mud weight (MR) |
| 219 | Total pump output (RT) |
| 220 | Pump 1 total strokes (RT) |
| 221 | Pump 2 total strokes (RT) |
| 222 | Drill collar 2 unit weight (MR) |
| 223 | Block height (RT) |
| 224 | Total drill collar length (Calc) |
| 225 | Bit nozzle total flow area (MR) |
| 226 | Total mud volume previous (RT) |
| 227 | Heavy weight drill pipe unit weight (MR) |
| 228 | Bit depth (RT) |
| 229 | Drill pipe friction (Calc) |
| 230 | Flow out rate (RT) |
| 231 | Total mud volume (RT) |
| 232 | Surface RPM (RT) |
| 233 | Hole depth (RT) |
| 234 | Drill pipe unit weight (MR) |
| 235 | Drill string weight (Calc) |
| 236 | Bit pressure drop (Calc) |
| 237 | Drill collar 1 friction (Calc) |
| 238 | Heavy weight drill pipe friction (Calc) |
| 239 | Total frictional pressure drop (Calc) |
| 240 | Differential pressure (RT) |
| 241 | Non-magnetic drill collar length (MR) |
| 242 | Plastic viscosity (MR) |
| 243 | Heavy weight drill pipe length (MR) |
| 244 | Yield point (MR) |
| 245 | Drill collar 2 friction (Calc) |
| 246 | Standpipe pressure (RT) |
| 247 | Drill pipe inner diameter (MR) |
| 248 | Surface torque (RT) |
| 249 | Hook load (RT) |
| 250 | Drill collar 2 inner diameter (MR) |
| 251 | Drill collar 1 inner diameter (MR) |
| 252 | Drill collar 2 outer diameter (MR) |
| 253 | Drill collar 1 outer diameter (MR) |
| 254 | Heavy weight drill pipe outer diameter (MR) |
| 255 | Heavy weight drill pipe inner diameter (MR) |
| 256 | Bit size (MR) |
| 257 | Drill pipe outer diameter (MR) |
| 258 | Weight on bit (RT) |

Figure 3:
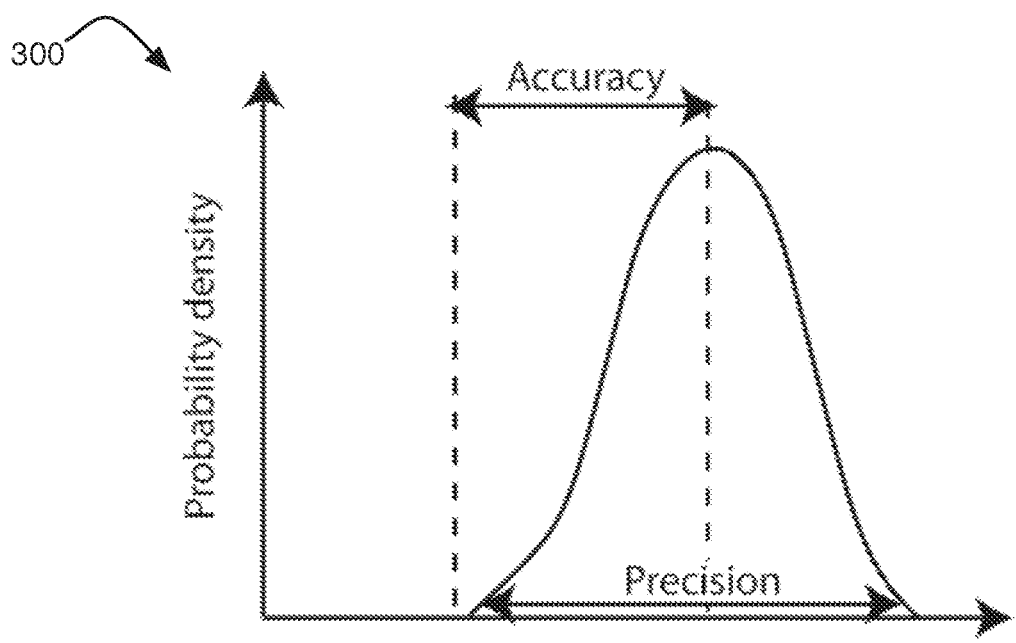
FIG. 3 illustrates an example of a relationship between accuracy and precision of sensor measurements that may be cleansed by systems and methods in accordance with the present invention.

When measuring parameters descriptive of the operation of a drilling rig, a sensor measurement may be described in terms of both accuracy and precision. Both accuracy and precision may be considered in validating sensor measurements (for example, in step 130 of exemplary method 100). The accuracy of a measurement is a measure of the closeness of the measurement to the actual value being measured. The precision of a measurement is descriptive of the confidence of the measurement, such as how likely the measurement is to be within a given range. The accuracy and/or precision of a sensor may be obtained through calibration, manufacturer data, and/or experience through use of the sensor in conjunction with other sensors having known precision and/or accuracy. FIG. 3 illustrates an example of a relationship between the accuracy and precision of a hypothetical sensor measurement. The model estimated value (for example, from a holistic Bayesian network model, such as shown in the example of FIG. 2) may be compared to received sensor data to identify a sensor fault. An upper bound, designated UB, and a lower bound, designated LB, may be used to identify sensor readings falling outside of the expected range of measurements given a sensor with known accuracy and precision. If the accuracy of a sensor is designated A and the precision of the sensor is designated P, a sensor reading may be identified as faulty if the reading falls outside of the range:

$$\text{sensor reading} + A + \frac{P}{2} \geq \text{model } LB$$

$$\text{sensor reading} - A - \frac{P}{2} \leq \text{model } UB$$

Figure 4:
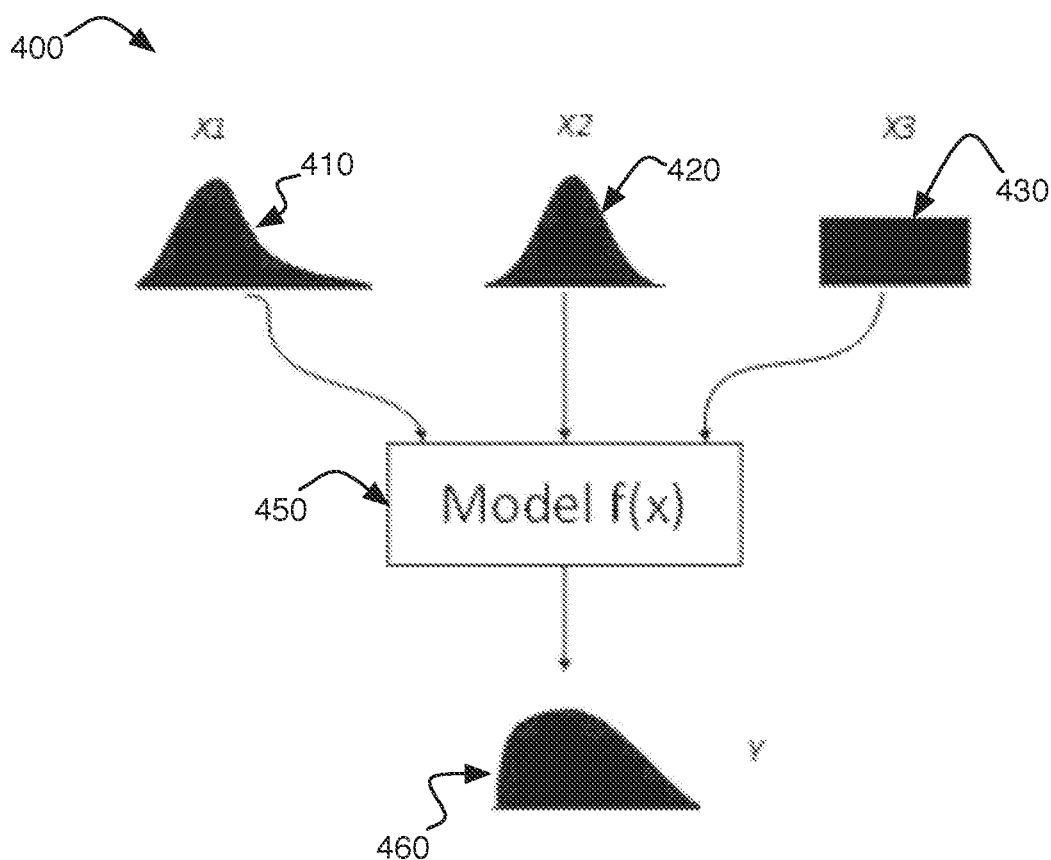
FIG. 4 illustrates an example of a modeling system that may be used in systems and methods in accordance with the present invention.

The example of FIG. 4 shows a system 400 wherein a model 450 operates as a function of a measured parameter, denoted x, which has a measured value and an uncertainty associated with that measured value. The uncertainty of a sensor measurement may depend upon the nature of the sensor itself and the conditions in which the sensor is operating. An exemplary model 450 in accordance with the invention may receive one or more sensor value, each having an associated error, and use the model 450 to generate another value, designated y, with an associated error. In the example depicted in FIG. 4, a model 450 receives a first sensor measurement 410, a second sensor measurement 420, and a third sensor measurement 430 and applies the model 450 to yield a resulting value y 460.

Figure 5:
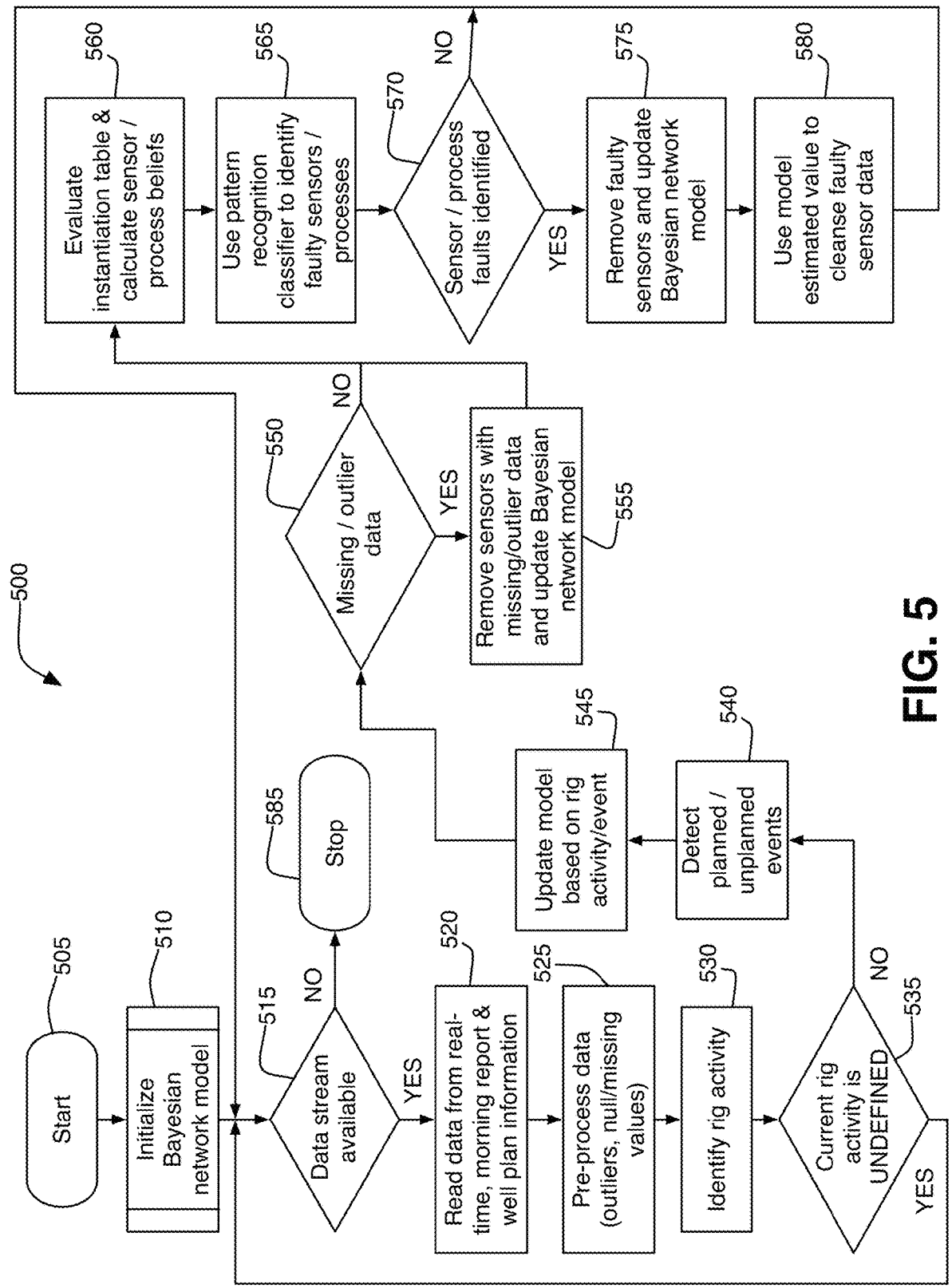
FIG. 5 illustrates a further exemplary method in accordance with the present invention.

Referring now to FIG. 5, an example of a method 500 for identifying sensor faults in accordance with the present invention is illustrated. Method 500 may be used, for example, as part of a validation step 130 of method 100 described above with regard to FIG. 1.

Method 500 of FIG. 5 may start 505 and initiate a Bayesian network model 510. The Bayesian network model initiated in step 510 may comprise, for example, the holistic Bayesian network model 200 depicted in FIG. 2, a similar Bayesian network model, or a different Bayesian network model adapted to a particular rig configuration or situation. Method 500 may then proceed to step 515 to determine whether a data stream is available for analysis. If no data stream is available for analysis, method 500 may proceed to stop in step 585. If, however, a data stream is available to analyze, method 500 may proceed to step 520. Step 520 may read data from real time sensor readings, morning report sensor readings of a historical nature, other historical sensor readings, and/or well plan information. Method 500 may then proceed to step 525 to preprocess the data to remove outliers, null and missing values, and the like, for example as described above in conjunction with preprocessing step 120 of method 100 described more fully in conjunction with FIG. 1.

Method 500 may proceed to step 530 to identify the rig activity corresponding to the data being analyzed. Different rig activities may create the expectation that different sensor readings may be viable and valid. By accounting for the rig activity, the proper interpretation and the validation of the collected sensor data may be more readily assured. Accordingly, if method 500 proceeds to step 535 and determines that the current rig activity is undefined based on the available data, method 500 may return to step 515 to determine whether a proper data stream is available. On the other hand, if a valid rig activity (for example, drilling, making a connection, tripping in or out of a hole, circulating or conditioning the drilling mud) is determined in step 535, method 500 may proceed to step 540.

In step 540, planned and unplanned events may be detected in the drilling process by automated software algorithms monitoring patterns in the real-time data. Examples of planned events may include starting/stopping the mud pumps, or removing/adding mud to the pits by the rig crew, while unplanned events may refer to influxes or losses of drilling mud to the formation, drillstring washouts, etc. The method 500 may then proceed to step 545 to update the Bayesian network model based on the rig activity or event defined. Method 500 may then proceed to step 550 to determine whether there are missing or outlier sensor readings. If the conclusion is that there are missing or outlier sensor readings, method 500 may proceed to step 555 to remove the nodes representing the sensors with the missing or outlier data from the Bayesian network model and update the Bayesian network model. If the conclusion of step 550 is that no sensor readings are missing or outliers, or after the conclusion of step 555 of removing from the model any sensors that have missing or outlier data, method 500 may proceed to step 560. Step 560 may evaluate an instantiation table for a Bayesian network model, such as the exemplary holistic Bayesian network model 200 described above with regard to FIG. 2, and calculate sensor and process beliefs using the Bayesian network model. Method 500 may then proceed to step 565 to use an automated pattern recognition technique, such as a neural network or support vector machine, to identify faulty sensors or processes based on the collected and modeled sensor readings. If no sensor or process faults are identified in step 570, method 500 may return to method 515 to incorporate new sensor data. If the conclusion of step 570 is that faults have been detected in one or more sensor or process, method 500 may proceed to step 575 to temporarily remove the faulty sensors from the Bayesian network model and to update the holistic Bayesian network model. After the update of step 575, method 500 may proceed to step 580 to use the model estimated value, described more fully below, to cleanse faulty sensor data. Method 500 may thereafter return to step 515 to re-iterate the process if a new data stream is available. The sensors removed in steps 555 and 575 may be periodically re-evaluated to determine if a missing, outlier or other faulty condition is present, and if that is no longer the case, those sensor nodes may be re-entered into the Bayesian network model. The re-evaluation of sensors removed from the model may be performed by the automated software at a fixed time interval, for example every 30 minutes, or after a change in rig state. In some examples, the sensor re-evaluation may additionally be done manually by a human operator, who, upon inspecting the sensor in question and confirming the presence of the fault, can take remedial actions such that the faulty condition is resolved.

Figure 6:
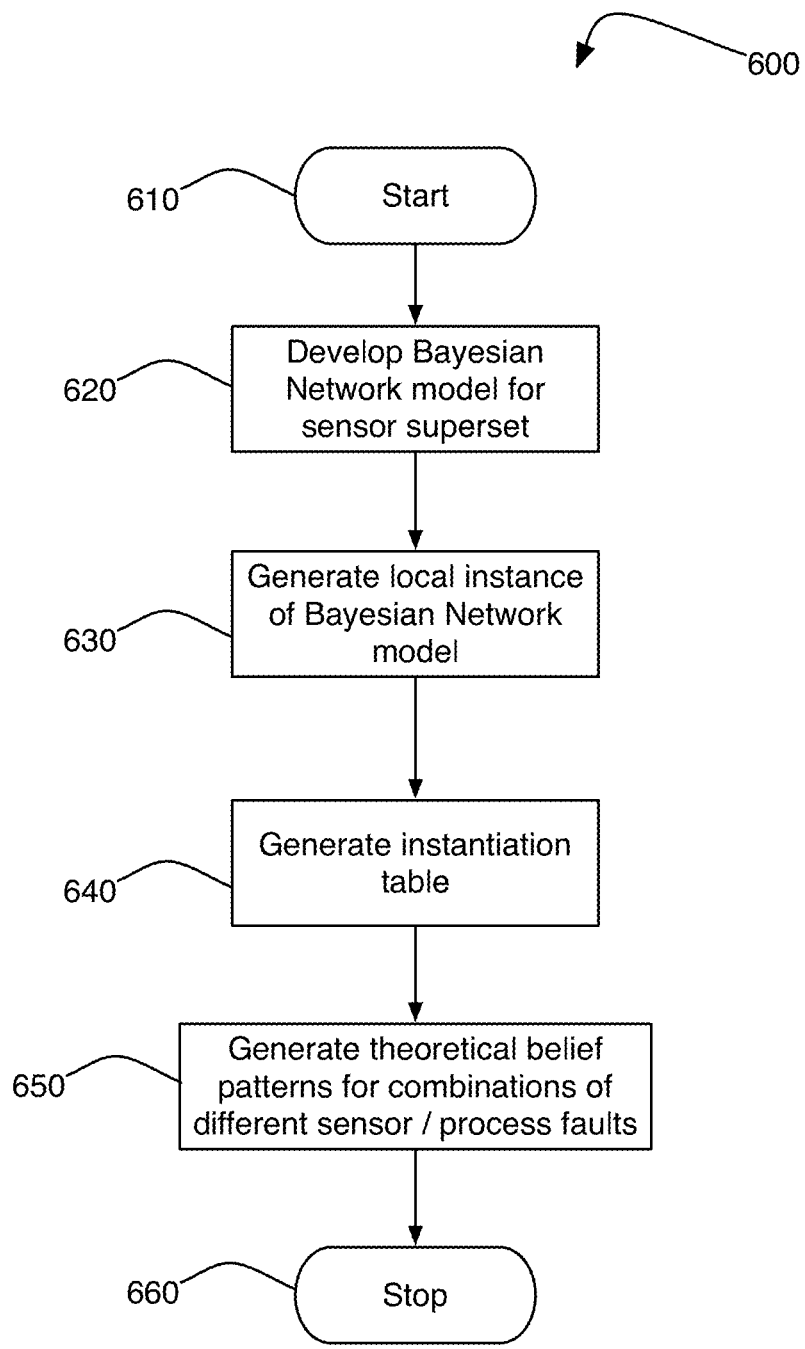
FIG. 6 illustrates a further exemplary method in accordance with the present invention.

Referring now to FIG. 6, an example of a method 600 to identify faults in drilling rig sensors is illustrated. Method 600 may start 610 and proceed to step 620 of developing a Bayesian network model for the sensor superset. Step 620 may use a holistic Bayesian network model, such as the example Bayesian network model described above and illustrated in FIG. 2. Step 620 may use historical drilling data and/or planning data to create the network model. Step 620 may be performed for a specific drilling rig or may be performed generally for drilling rigs of a particular type and/or configuration. Method 630 may generate a local instance of the Bayesian network model, for example for use in conjunction with the drilling rig being monitored by the sensors providing measurements that may be cleansed by method 600. Step 640 may generate an instantiation table to represent, for example, the weights between different links within the model, those weights being representative of the probabilistic relationships between the nodes of the network model (the nodes themselves representative of different sensors and/or drilling properties). Method 600 may then proceed to step 650 to generate theoretical belief patterns for combinations of different sensors or processes that exhibit faults. The belief patterns generated in step 650 may be used to identify faults in sensor readings collected and may be updated as additional data is collected. Method 600 may then stop in step 660.

Figure 7:
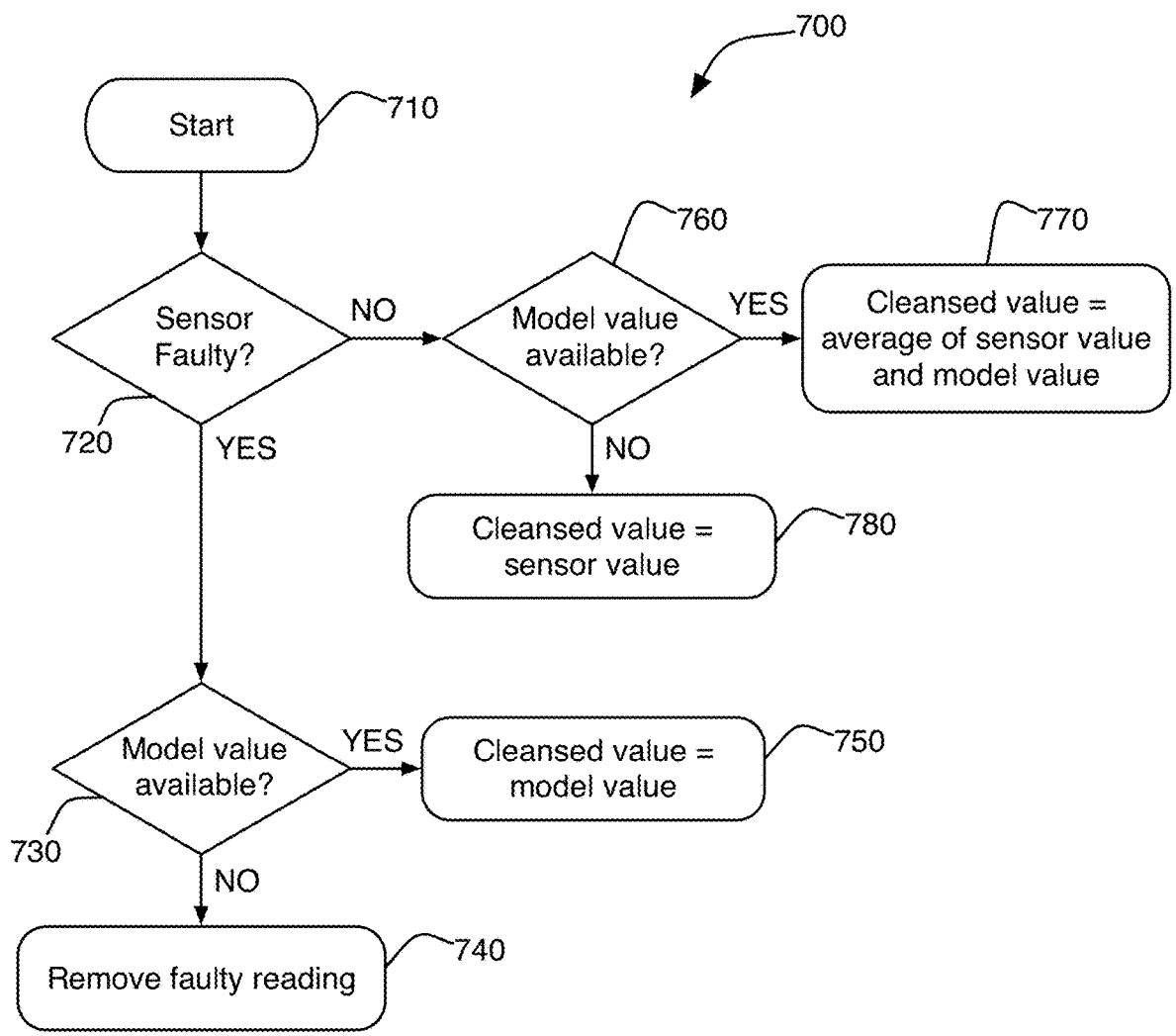
FIG. 7 illustrates a further exemplary method in accordance with the present invention.

FIG. 7 illustrates an example of a method 700 to cleanse data from some types of drilling rig sensors. Method 700 may be particularly useful for cleansing data from flow out sensors, total pump output/flow in sensors, standpipe pressure sensors, and/or mud pit volume sensors, but method 700 is not limited to use with any particular type of sensor or measurements. Method 700 may start 710 to determine whether a sensor is faulty. Step 710 may be performed using a holistic Bayesian network, such as the example described above and illustrated in the example of FIG. 2.

If the sensor is determined to be faulty in step 720, method 700 may proceed to step 730 to determine whether a model value for a sensor reading is available. If a model value for the faulty sensor is available, that model value may be used as the cleansed sensor value in step 750. If, however, the outcome of step 730 is that no model value is available for the faulty sensor, method 700 may proceed to step 740 to remove the faulty sensor reading from the data used for monitoring.

Still referring to FIG. 7, if the outcome of step 720 is to conclude that the sensor is not faulty, method 700 may proceed to step 760 to determine whether a model value is available for that sensor. If no model value is available for that sensor, the model value for future use may be set as the sensor (non-faulty) value in step 780. If the conclusion of step 760 is that a model value is available, the model value may be updated by setting the new cleansed value as the average of the current (non-faulty) sensor value and the model value.

Figure 8:
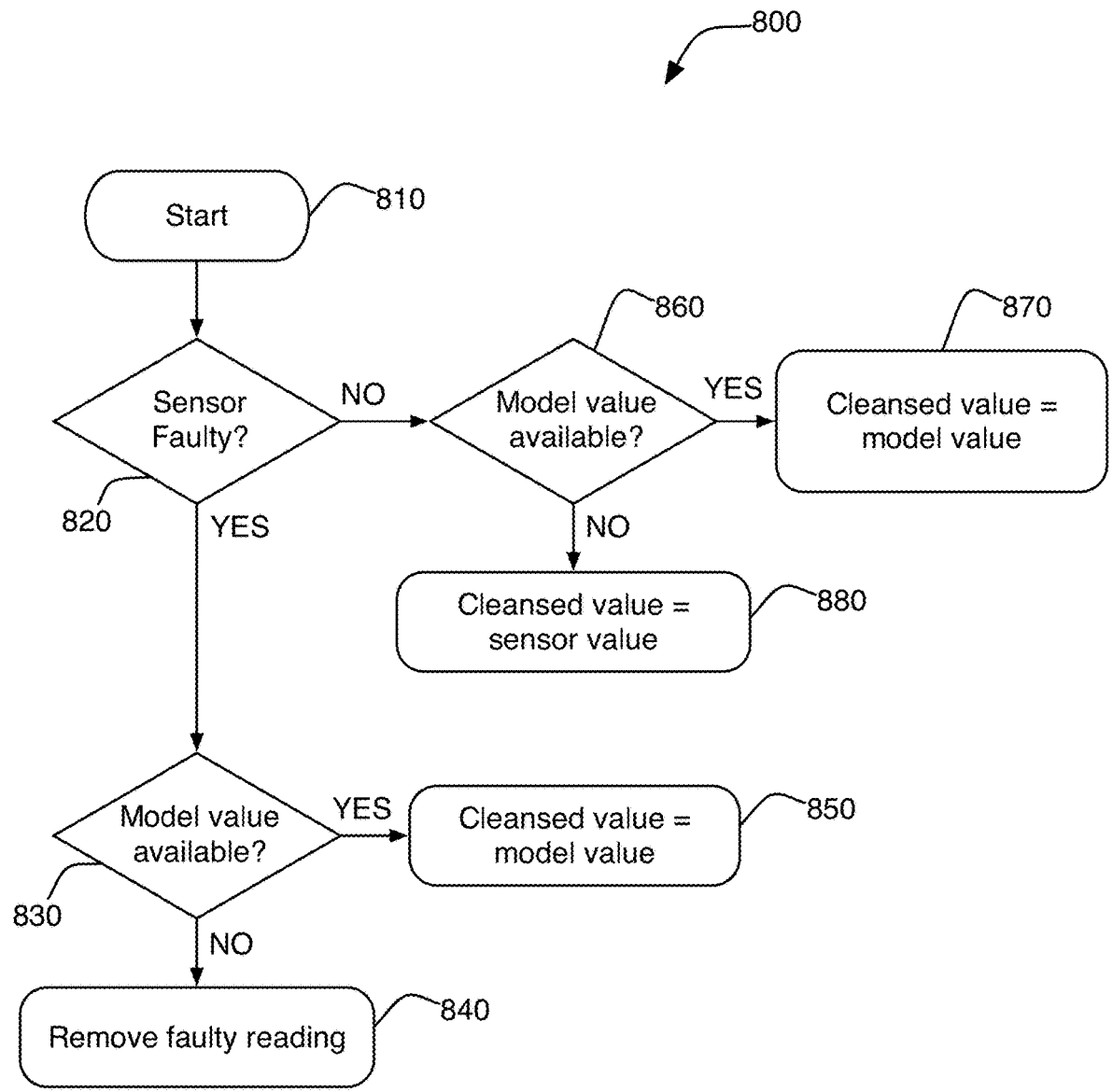
FIG. 8 illustrates a further exemplary method in accordance with the present invention.

Referring now to FIG. 8, a further exemplary method 800 for cleansing sensor readings is illustrated. Method 800 may be particularly useful for cleansing measurements received from hook load sensors and torque sensors, but method 800 is not limited to any particular type of sensor. Method 800 may start 810 and determine whether a sensor is faulty in step 820. If the sensor is not faulty, method 800 may proceed to step 860 to determine whether a model value is available for that sensor for future purposes. If no model value is available for that sensor, method 800 may proceed to step 880 to set the cleansed value as equal to the (non-faulty) sensor value. If, however, the conclusion of step 860 is that a prior model value is available, method 800 may proceed to step 870 to set the cleansed value as equal to the existing model value.

Still referring to the method 800 and the example of FIG. 8, if the outcome of step 820 is to conclude that the sensor is faulty, method 800 may proceed to step 830 to determine whether a model value is available to replace the value reported by the faulty sensor. If no model value is available, method 800 may proceed to step 840 to remove the faulty sensor data. If, however, the result of step 830 is that a model value is available for the sensor, method 800 may proceed to step 850 to set the cleansed value for the sensor as equal to the model value.

Figure 9:
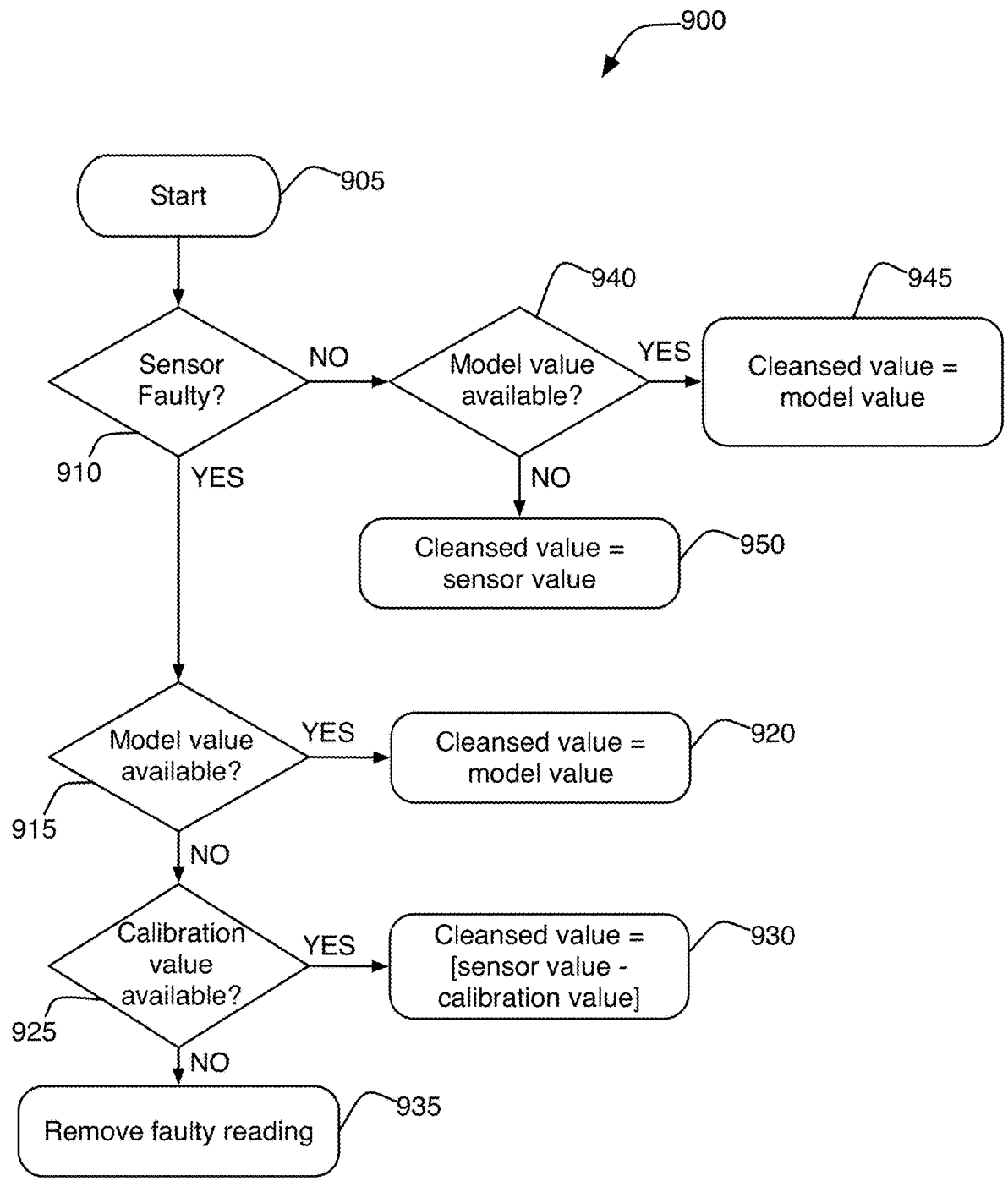
FIG. 9 illustrates a further exemplary method in accordance with the present invention.

Referring now to FIG. 9, a further example of a method 900 in accordance with the present invention for cleansing sensor data is illustrated. Method 900 depicted in the example of FIG. 9 may be particularly useful for cleansing block height sensor data, but method 900 is not limited to use with any particular type of sensor or data. Method 900 may begin 905 and proceed to step 910 to determine whether a sensor is faulty. If the conclusion of step 910 is that the sensor is not faulty, method 900 may proceed to step 940 to determine whether a model value is available for that sensor. If no model value is available for that sensor, step 950 may set the cleansed value for future use as the (non-faulty) measured sensor value. If, however, the outcome of step 940 is to conclude that a model value is available, the cleansed value for future use may be set as the model value in step 945.

Still referring to method 900 depicted in the example of FIG. 9, if the conclusion of step 910 is that the sensor is faulty, method 900 may proceed to step 915 to determine whether a model value for that sensor is available. If the conclusion of step 915 is that a model value is available, method 900 may proceed to step 920 to set the cleansed value as equal to the model value. If the conclusion of step 915 is that no model value is available, method 900 may proceed to step 925 to determine whether a calibration value (zero offset value) obtained as a result of taring the sensor is available for that sensor. If the conclusion of step 925 is that a calibration value is available, method 900 may proceed to step 930 to set the cleansed value for the sensor as equal to the sensor value minus the calibration value. If the conclusion of step 925 is that no calibration value is available, method 900 may proceed to step 935 to remove the faulty sensor value from the data set.

Figure 10:
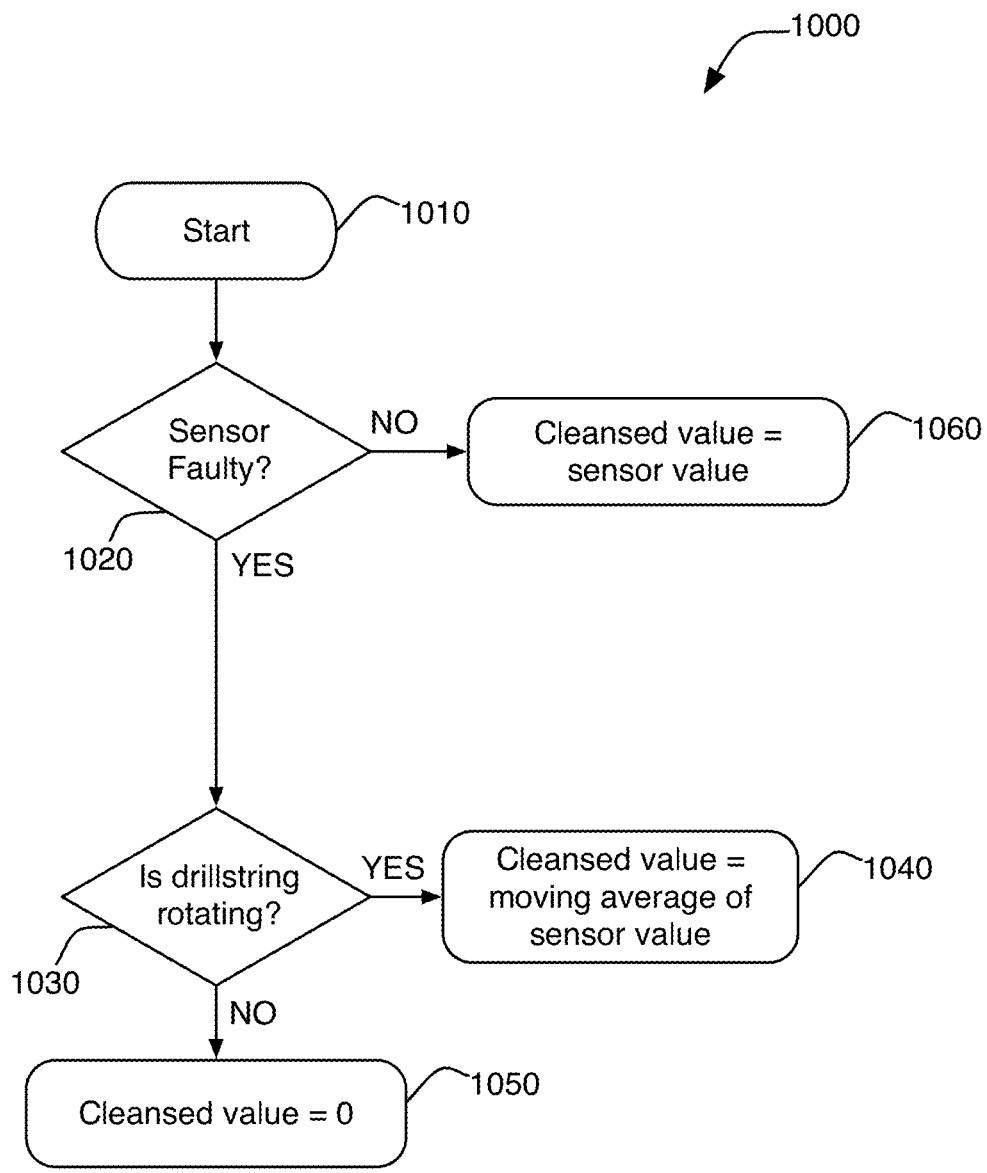
FIG. 10 illustrates a further exemplary method in accordance with the present invention.

Referring now to FIG. 10, an example method 1000 for cleansing sensor data is illustrated. Method 1000 may be particularly useful for cleansing RPM sensors, but method 1000 is not limited to any particular type of sensor or data. Method 1000 may start 1010 and proceed to step 1020 to determine whether a sensor is faulty. If the conclusion of step 1020 is that the sensor is not faulty, method 1000 may proceed to step 1060 to set the cleansed value for future use as equal to the (non-faulty) sensor value. If the conclusion of step 1020 is that the sensor is faulty, method 1000 may proceed to step 1030 to determine whether the drill string is rotating, for example, by inspection of other sensor readings (such as top drive torque). If the conclusion of step 1030 is yes, the method 1000 may proceed to step 1040 to set the cleansed value as equal to a moving average of the sensor value. If the conclusion of step 1030 is that the drill string is not rotating, method 1000 may proceed to step 1050 to set the cleansed value equal as to zero.

Figure 11:
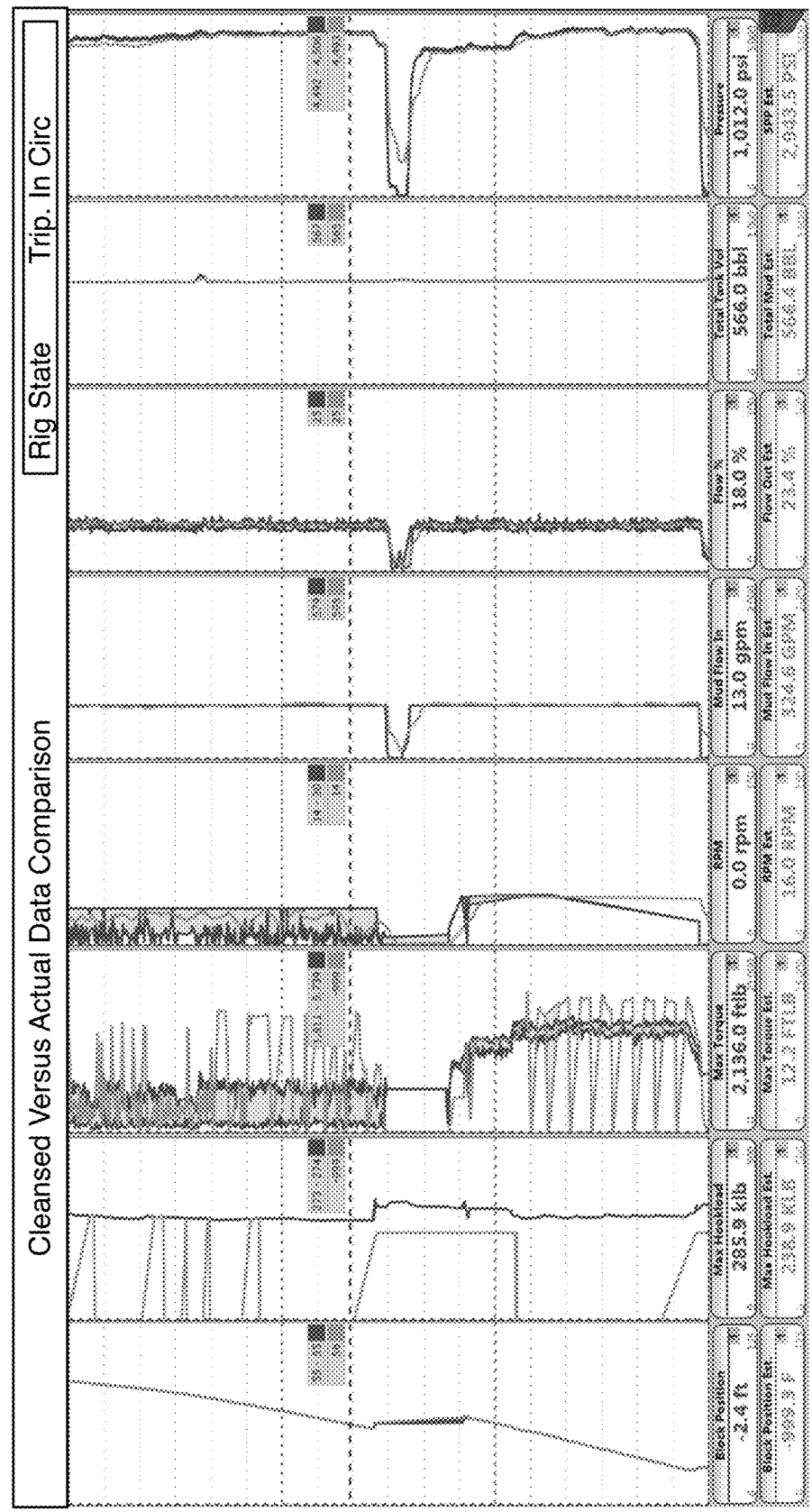
FIG. 11 illustrates an example user interface for systems and methods in accordance with the present invention.

Referring now to the example of FIG. 11, a user interface display 1100 illustrating sensor readings and cleansed sensor readings made in accordance with the present invention is illustrated. By cleansing sensor readings, a more consistent data trend and more realistic set of data points based upon sensor readings may be presented.

Systems and methods in accordance with the present invention may improve the data used for monitoring and modeling drilling rig performance. The systems and methods in accordance with the present invention may be applied to a variety of upstream exploration and production operations in oil and gas drilling, such as drilling operations, completions, hydraulic fracturing, and the like. The use of a Bayesian network model that aggregates real-time sensor data streams with daily operations reports and/or well planning information provides the ability to identify faulty sensor readings from the dataset used to make decisions regarding drilling operations, rather than merely identifying and removing sensor readings that are missing or obvious outliers. Rather than merely removing missing and outlier sensor readings, systems and methods in accordance with the present invention identify sensor readings that are inherently wrong but do not stand out in isolation from other drilling measurements. Furthermore, systems and methods in accordance with the present invention permit those readings to be removed from the dataset or, in many examples, replaced with cleansed values that more accurately represent the state of the drilling operation. Systems and methods in accordance with the present invention thereby improve the quality of the data relied upon for other monitoring, modeling, and/or management purposes. The use of sensor accuracy and precision information combined with modeling the uncertainty bounds enables more effective detection of a fault in a sensor. The use of rig state detection, whether automatic or manual, permits the adaptation of the Bayesian network model that is used to validate and repopulate faulty data from sensors. The temporary removal of faulty sensors or sensors with missing or outlier data from the Bayesian network model prevents the use of faulty data to model the drilling operations.

By re-entering faulty sensors into the network after a period of time and reevaluating the readings of those sensors, the additional data available from the sensors may be utilized if the fault in the sensor has been remedied in some way, such as maintenance/re-calibration or, as is often the case, due to the end of a transitory fault condition. The use of a Bayesian network model in accordance with the present invention and systems and methods as described herein enable estimation of the values of a faulty rig sensor in order to continue to provide a reasonable and useful approximation of rig operations.

The invention claimed is:

1. A drilling monitoring system comprising:
    a plurality of sensors that measure attributes of drilling equipment or well conditions in real time;
    at least one data connection that transmits measurements made by the plurality of sensors to a control unit;
    in the control unit, a computer processor executing machine readable code stored in a non-transitory medium to:
        construct a prior Bayesian network model using previously received measurements;
        synchronize the received measurements made by the plurality of sensors to correspond to a time at which each measurement was made;
        synchronize the received measurements made by the plurality of sensors to correspond to a depth of the measurement;
        identify a current rig activity associated with the drilling equipment using the received measurements as well as the time and the depth of the received measurements;
        process received measurements to identify missing measurements and remove outlier measurements based, at least in part, on the identified rig activity;
        create cleansed measurements by removing faulty measurements from the received measurements by comparing each of the received measurements to an accuracy and precision associated with the sensor making that measurement to the prior Bayesian network model to identify and remove measurements outside of a range defined by a lower bound and an upper bound for the sensor making the measurement and by comparing the received measurements to generated belief patterns for identifying faults;
        repopulating the prior Bayesian network model using the cleansed data to allow for an updated Bayesian network model; and
        providing the cleansed measurements for drilling analytics associated with a drilling operation related to the drilling equipment.

2. The drilling monitoring system of claim 1, wherein the construction of the prior Bayesian network model using previously received measurements comprises using real-time measurements and morning report data.

3. The drilling monitoring system of claim 2, wherein processing received measurements to identify missing measurements and remove outlier measurements comprises identifying null values or omissions from a sensor as missing measurements.

4. The drilling monitoring system of claim 2, wherein processing received measurements to identify missing measurements and remove outlier measurements comprises identifying physically impossible measurements as outlier measurements.

5. The drilling monitoring system of claim 4, further comprising identifying a rig activity of the drilling equipment and updating the Bayesian network based on the identified rig activity.

6. The drilling monitoring system of claim 4, further comprising detecting an event and updating the Bayesian network based on the detected event.

7. The drilling monitoring system of claim 4, wherein creating cleansed measurements comprises creating at least one cleansed measurement from at least one sensor selected from the group of flow out sensors, total pump output/flow in sensors, standpipe pressure sensors, and mud pit volume sensors.

8. The drilling monitoring system of claim 4, wherein creating cleansed measurements comprises creating at least one cleansed measurement from at least one sensor selected from the group of hook load sensors and torque sensors.

9. The drilling monitoring system of claim 4, wherein creating cleansed measurements comprises creating at least one cleansed measurement from a block height sensor.

10. The drilling monitoring system of claim 4, wherein creating cleansed measurements comprises creating at least one cleansed measurement from an RPM sensor.

11. A method for modeling drilling operations comprising:
    measuring parameters descriptive of drilling equipment or well conditions using a plurality of sensors in real time;
    transmitting at least a portion of the measurements made by at least a portion of the plurality of sensors to a control unit;
    in the control unit,
        constructing a prior Bayesian network model using previously received measurements,
        synchronizing the received measurements made by the plurality of sensors to correspond to a time at which each measurement was made,
        synchronizing the received measurements made by the plurality of sensors to correspond to a depth of the measurement,
        identify a current rig activity associated with the drilling equipment using the received measurements as well as the time and the depth of the received measurements,
        processing the received measurements to remove outlier measurements based, at least in part, on the identified rig activity, creating cleansed measurements by removing faulty measurements from the received measurements by comparing each of the received measurements to an accuracy and precision associated with the sensor making that measurement to the prior Bayesian network model to identify and remove measurements outside of a range defined by a lower bound and an upper bound for the sensor making the measurement and by comparing the received measurements to generated belief patterns for identifying faults, repopulating the prior Bayesian network model using the cleansed data measurements to allow for an updated Bayesian network model, and providing the cleansed measurements for drilling analytics associated with a drilling operation related to the drilling equipment.

12. The method for modeling drilling operations of claim 11, further comprising, in the control unit, processing the received measurements to identify missing measurements.

13. The method for modeling drilling operations of claim 12, further comprising removing nodes representing sensors with missing or outlier data from the Bayesian network model and then updating the Bayesian network model.

14. The method for modeling drilling operations of claim 13, wherein cleansing a faulty sensor reading comprises replacing the faulty sensor reading with a modeled sensor value if a modeled sensor value is available and comprises removing the faulty sensor reading if no modeled sensor value is available.

15. The method for modeling drilling operations of claim 13, wherein cleansing a faulty sensor reading comprises replacing the faulty sensor reading with a modeled sensor value if a modeled sensor value is available, comprises modifying the faulty sensor value using a calibration value for the sensor if no modeled sensor value is available, and comprises removing the faulty sensor reading if no modeled sensor value is available and no calibration value for the sensor are available.

16. The method for modeling drilling operations of claim 13, wherein cleansing a faulty sensor reading comprises replacing the faulty sensor reading with a moving average of the sensor value.

17. A system for measuring drilling equipment and well conditions, the system comprising:
at least one sensor that measures at least one attribute of drilling equipment and at least one sensor that measures at least one attribute of well conditions, each measurement made by a sensor having a value and an associated predefined error, each measurement being further associated with a time of the measurement and a depth of the measurement;
at least one data connection that transmits measurements made by the at least one sensor that measures at least one attribute of drilling equipment and the at least one sensor that measures at least one attribute of well conditions of sensors to a control unit, the control unit associating the pre-defined error of the measurement with each measurement received over the at least one data connection;
in the control unit, a computer readable record of prior sensor measurements and the associated pre-defined error maintained in a non-transitory form and a computer processor that executes machine readable code stored in a non-transitory medium, the machine-readable code causing the computer processor of the control unit to:
construct a prior Bayesian network model using previously received measurements and the associated error;
synchronize the received measurements made by the plurality of sensors to correspond to a time at which each measurement was made;
synchronize the received measurements made by the plurality of sensors to correspond to a depth of each measurement;
identify a current rig activity associated with the drilling equipment using the received measurements as well as the time and the depth of the received measurements;
process the received measurements to identify missing measurements and to remove outlier measurements based, at least in part, on the identified rig activity;
create cleansed measurements by removing faulty measurements from the received measurements to an accuracy and precision associated with the sensor making that measurement to the prior Bayesian network model to identify and remove measurements outside of a range defined by a lower bound and an upper bound for the sensor making the measurement and by comparing the received measurements to generated belief patterns for identifying faults;
repopulating the prior Bayesian network model using the cleansed data to allow for an updated Bayesian network model; and
providing the cleansed measurements for drilling analytics associated with a drilling operation related to the drilling equipment.

18. The system for measuring drilling equipment and well conditions of claim 17, wherein creating cleansed measurements further comprises creating replacement values for missing and outlier values.

19. The drilling monitoring system of claim 18, further comprising identifying a rig activity of the drilling equipment and updating the Bayesian network based on the identified rig activity.

20. The drilling monitoring system of claim 19, further comprising detecting an event and updating the Bayesian network based on the detected event.

* * * * *